United States Patent [19]

Ratner

[11] Patent Number: 5,040,647
[45] Date of Patent: Aug. 20, 1991

[54] CONTOURED FLOATING FRICTION RING FOR AUTOMATIC TRANSMISSION TORQUE CONVERTERS

[76] Inventor: Michael Ratner, 67-33 170th St., Flushing, N.Y. 11365

[21] Appl. No.: 578,340

[22] Filed: Sep. 6, 1990

[51] Int. Cl.[5] .................... F16H 45/02; F16D 69/02
[52] U.S. Cl. ............................... 192/3.28; 29/401.1; 29/402.21; 192/107 M
[58] Field of Search ............... 192/3.28, 3.29, 3.3, 192/107 M; 29/401.1, 402.08, 402.21

[56] References Cited

U.S. PATENT DOCUMENTS 3,270,846  9/1966  Arledter et al. ............ 192/107 M X
4,289,048  9/1981  Mikel et al. ................... 192/3.29 X
4,493,406  1/1985  Bopp ............................. 192/3.28 X Primary Examiner—Rodney H. Bonck
Attorney, Agent, or Firm—Bernard Lieberman

[57] ABSTRACT

A contoured floating friction ring for general use in automobile lock-up clutch mechanisms of the type which include, a front cover having a friction bearing base surface and circumferential side wall, and a cooperating pressure plate provided with a bonded friction ring. The friction ring includes a base section which is disposed over the friction bearing surface, a bridging section which is disposed in conforming relation to the junction between the base and circumferential side wall of the cover, and an outer edge section which extends outwardly from the bridging section in overlying relation to the circumferential wall.

20 Claims, 5 Drawing Sheets

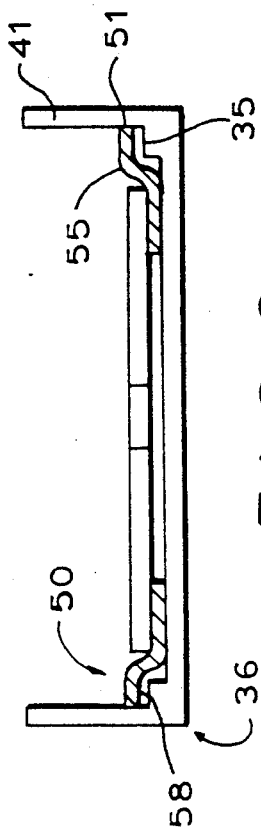
FIG. 6
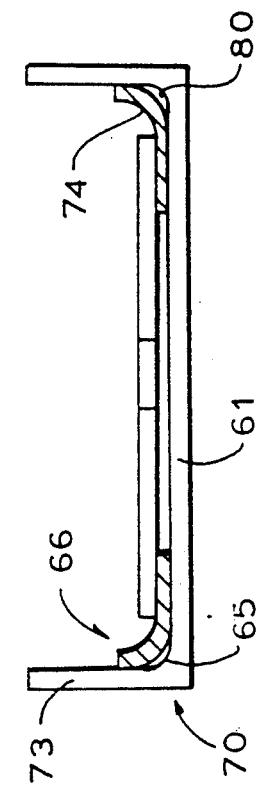
FIG. 7
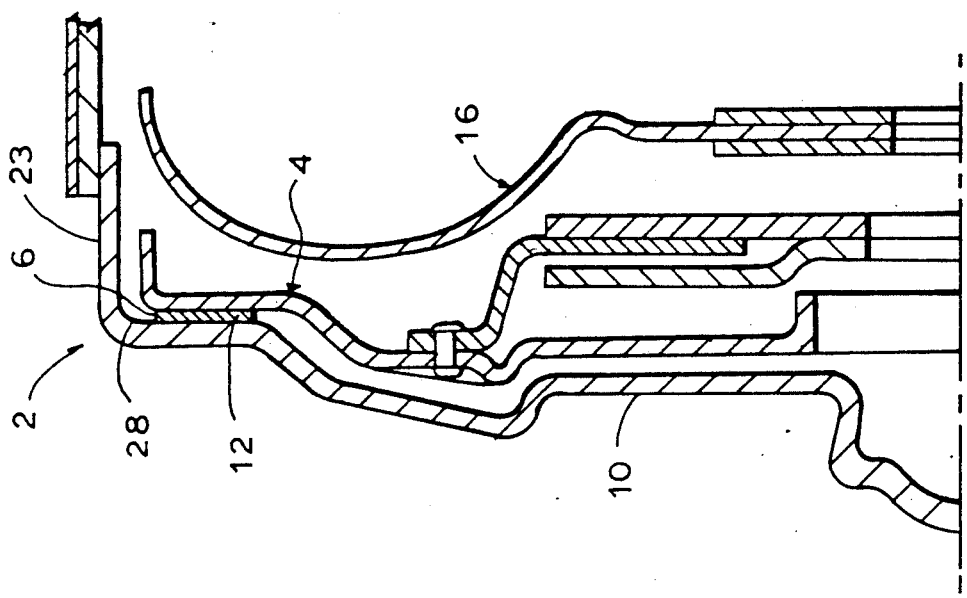
PRIOR ART FIG. 2

CONTOURED FLOATING FRICTION RING FOR AUTOMATIC TRANSMISSION TORQUE CONVERTERS

FIELD OF THE INVENTION

This invention generally relates to the friction rings used in the lock-up clutch mechanisms of automobile torque converters. More particularly, this invention relates to the retrofitting of floating friction rings into conventional torque converters which were originally manufactured with bonded friction rings.

BACKGROUND ART

Torque converter type automatic transmissions are used extensively by the automobile industry in motor vehicle applications. These torque converters operate to hydraulically couple the torque output of the engine to the gear box of the transmission. Lock-up clutches are used in torque converters to improve fuel economy at cruising speeds by reducing the power losses caused by the inherent slippage in the hydraulic coupling. Lock-up clutches are designed to engage above a predetermined minimum vehicle speed and effect a direct mechanical coupling of the engine and the transmission gear box. This results in a bypassing of the hydraulic coupling and an elimination of the slippage in the automobile drive train.

Conventional lock-up clutches have three main components; a pressure plate, a front cover and a friction ring. The mechanical coupling effected by the clutch is achieved by forcibly extending the pressure plate of the clutch until it squeezes the friction ring between itself and the base plate of the front cover. An example of a conventional torque converter lock-up clutch can be found in Mikel U.S. Pat. No. 4,289,048.

An exploded view of the major components of a conventional torque converter manufactured by General Motors Corp., Detroit, Mich. (GM), is shown in FIG. 1. The converter includes a lock-up clutch having a front cover 2, a pressure plate 4 and an annular friction ring 6 bonded to the pressure plate surface 8 facing the front cover 2. The base plate 10 of the front cover 2 has a friction surface 12 for engaging the bonded friction ring 6. The torque converter further includes an impeller 14 which hydrokinetically drives a turbine 16. When assembled, the turbine 16 is connected to the output shaft (not shown) of the converter and the impeller 14 is welded to the front cover 2 which is in turn connected to the engine crankshaft (not shown). Thus, the torque output of the engine is transmitted to the impeller 14 by the front cover 2 and then through the transmission fluid to the turbine 16 and the automobile drive train.

FIG. 2 is a partial cross sectional view of the GM converter clutch showing the clutch in its engaged position. Referring to FIG. 2, the pressure plate 4 which is connected to the turbine 16 has been extended outward from the turbine 16 until the bonded friction ring 6 has contacted the base plate friction surface 12. This effects a direct mechanical coupling of the front cover 2, pressure plate 4 and turbine 16 resulting in a bypassing of the hydraulic coupling and an elimination of the slippage in the drive train. This view also shows that the GM front cover 2 has a rounded inner corner 28 at the intersection of the base plate 10 and the side wall 23.

In conventional applications, the friction ring in the lock-up clutch is made of a heat and wear resistant material. Examples of such prior art material can be found in H. F. Arledter et al U.S. Pat. No. 3,270,846. The ring in conventional applications is either bonded to one of the clutch surfaces or floats freely in between them. Floating friction rings, because of their dual friction surfaces, have longer lives and provide better sealing within torque converters. Conversely, bonded friction rings, which only have a single friction surface, cannot provide these additional benefits. Therefore, when rebuilding torque converter clutches which originally employed bonded friction rings, it would be advantageous to replace them with floating rings. However, these bonded applications are not generally retrofitable with floating friction rings because their front covers do not have squared ring receiving surfaces.

Conventional floating rings are flat annular disks and therefore require that the inside corners of the front cover be square in order to properly interact with the outer edge of the ring. Without the squared corners, the ring cannot be properly piloted and centered within the main bore of the front cover. Therefore, when retrofitting floating rings into bonded applications, machining is necessary to remove the interfering surfaces which exist at the periphery of the base plate of the front cover in order to create a squared receiving surface for the ring. However, this machining cannot be accomplished without significant damage to the front cover and, therefore, the old bonded ring must be replaced by a new bonded ring having the same disadvantages.

FIG. 3 is a diagrammatic cross sectional view of a bonded application clutch 40 retrofitted with a conventional flat floating friction ring 30. This figure is an illustration of the type of problem which the preferred embodiment is designed to eliminate. Referring to FIG. 3, the pressure plate 32 has engaged the friction ring 30 but the base plate 34 of the front cover 36 has an annular interfering surface 35 extending outwardly at its periphery which prevents the floating friction ring 30 from engaging the base plate friction surface 33. Therefore, in order to install the floating friction ring 30 in this type of converter, it is necessary to machine the front cover 36 to remove the interfering surface 35 to allow the friction ring 30 to sit squarely within the bore 37 of the front cover 36 thereby properly engaging the base plate friction surface 33.

Replacement of an old bonded ring with a new one involves removing the old clutch surface and adhesive by mechanical or chemical methods, preparing the metal surface to receive the new ring, applying adhesive and adhering the ring to the clutch surface through the application of heat and pressure, (several examples of bonding frictional materials to metal surfaces can be found in the Arledter patent). On the other hand, retrofitting with a floating friction ring would only require the removal of the old ring and would eliminate the processing associated with adhering a new ring. Therefore, if it were not for the aforementioned problems associated with the interfering surfaces on the base plate, retrofitting a bonded application with a floating friction ring would involve less processing of the clutch parts and result in time and money savings.

Accordingly, it is the broad object of the present invention to provide a contoured floating friction ring for general use in torque converter lock-up clutches.

A more specific object of the invention is to provide a contoured floating friction ring for use in retrofitting conventional bonded ring torque converters.

Another object of the invention to provide method for custom fabrication of the contoured floating friction ring of the invention.

A still further object of the invention is to provide a floating friction ring and method of fabrication which effect economies in materials and retrofitting applications thereof.

DISCLOSURE OF THE INVENTION

In the present invention, these purposes, as well as others which will be apparent, are achieved generally by providing a floating friction ring for use in a torque converter which includes a front cover and a pressure plate, the front cover including a base plate having a friction surface, outer peripheral edge and generally axial circumferential side wall which extends outwardly from the pheripheral edge. The floating friction ring comprises a base section which is disposed over the friction surface; a bridging section which extends outwardly from an outer edge of the base section, the bridging section being disposed in conforming relation to an interfering junction between the base plate and circumferential side wall of the cover; and an outer edge section which extends outwardly from the bridging section in overlying relation to the circumferential side wall.

According to the invention, the friction ring is contoured to avoid intimate contact with interfering surfaces on the base plate of the front cover. Therefore, when the clutch is engaged, only the friction surface of the friction ring engages the base plate of the front cover while a clearance is maintained between the interfering surfaces and the remaining ring surface. By contouring the ring, the need for machining the front cover when retrofitting bonded applications is eliminated. Furthermore, by avoiding contact with the interfering surfaces, there is no excessive wear from uneven engagement of the ring with the base plate which could result in early failure of the ring.

In a first preferred embodiment, an outer edge of the floating friction ring includes a circumferential wall or edge section which extends outwardly from the peripheral edge and slidably contacts the side wall of the front cover to pilot and center the ring during operation of the clutch. This feature maintains the ring in proper orientation—a pilot function—reducing distortion of the ring resulting from uneven frictional contact at its periphery. Provision of this circumferential wall also increases the strength and rigidity of the friction ring and enhances its uniform engagement with clutch surfaces for improved ring performance.

In an alternative preferred embodiment, the circumferential wall of the friction ring extends in spaced overlying relation from the cover. Avoidance of contact between the ring and cover in this structure enhances the piloting function of the ring.

In another embodiment, arrangements of the first described friction rings are provided with a circumferential wall wich includes circumferentially spaced edge sections connected by squared edge members. Use of segments in the wall yields an improved uniform contour in the ring wall which is advantageously free of crimping or bunched areas, as well as material savings in the ring fabrication. In operation of the torque converter, the segments further facilitate lubrication of the converter and displacement of excess oil in clutch application.

In accordance with a method of the invention, conventional friction paper which may of the type including a phenolic resin impregnation, is provided in an uncured state and molded into the contoured friction ring of the invention by application of heat and pressure.

For fabrication of the ring member of the last described embodiment, the invention employs a ring die which includes a generally annular base which defines a central opening, and a radiused peripheral flange which extends outwardly from the base.

Other objects, features and advantages of the present invention will be apparent when the detailed description of the preferred embodiments of the invention are considered in conjunction with the drawings which should be construed in an illustrative and not limiting sense as follows:

BRIEF DESCRIPTION OF THE DRAWINGS

FIG. 2 is a partial diagrammatic cross-section of the GM torque converter;

FIG. 6 is a diagrammatic cross-section of a second preferred embodiment of a friction ring in accordance with the the invention retrofitted into the converter of FIG. 3;

FIG. 7 is a diagrammatic cross-section of a third preferred embodiment of a friction ring in accordance with the invention retrofitted into a bonded application similar to the GM torque converter shown in FIGS. 1 and 2.

BEST MODE OF CARRYING OUT THE INVENTION

Figure 1:
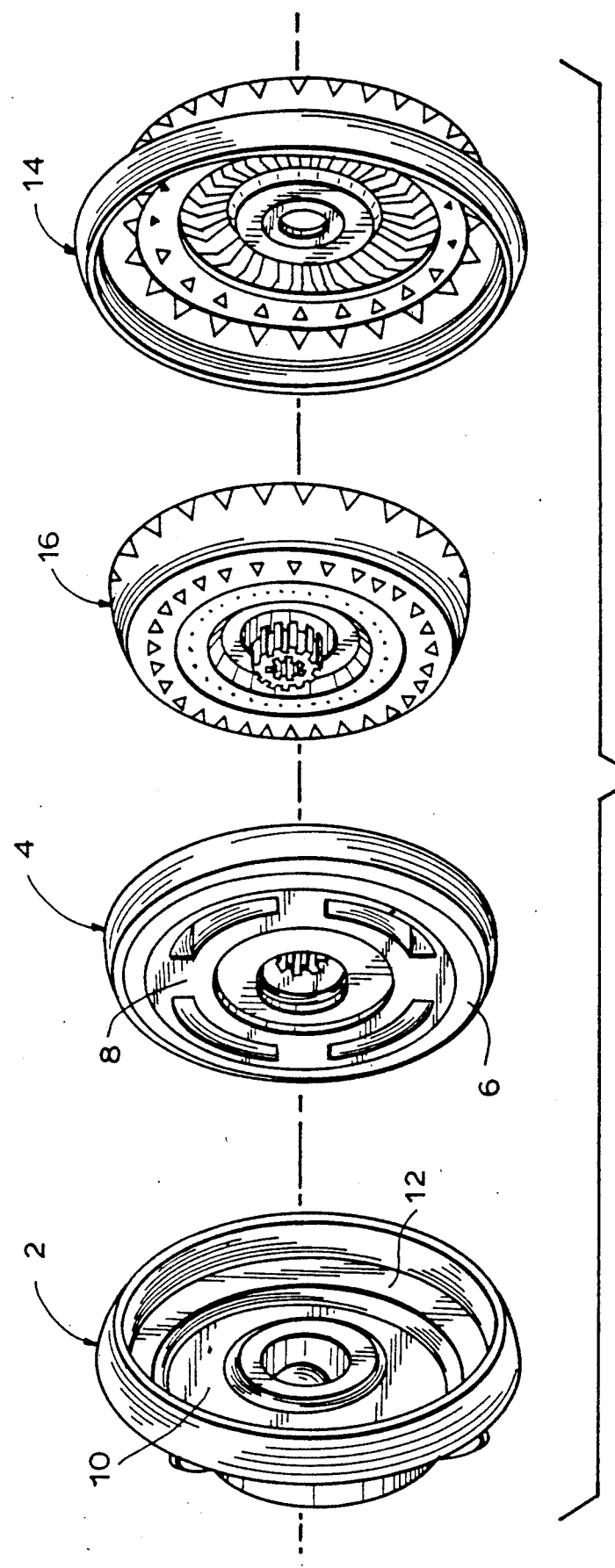
FIG. 1 is an exploded perspective view of the major components of a torque converter manufactured by General Motors Corp. (GM)
Figure 3:
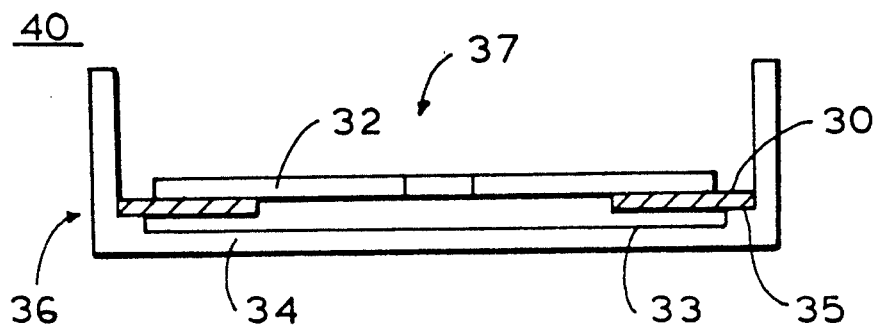
FIG. 3 is a diagrammatic cross-section of a bonded application converter lock-up clutch retrofitted with a conventional flat floating friction ring.
Figure 4:
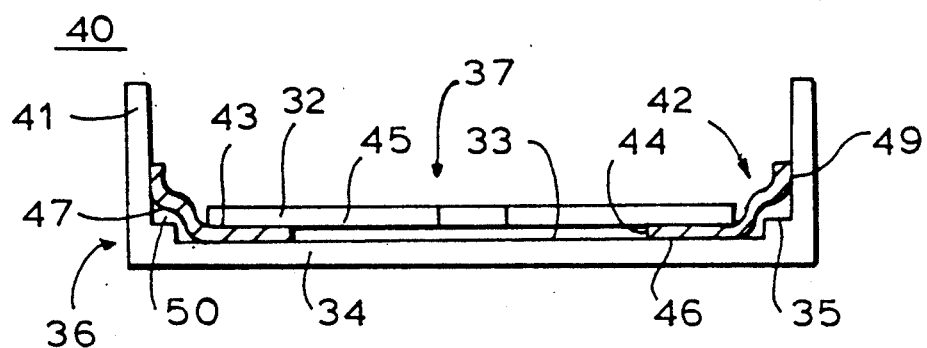
FIG. 4 is a diagrammatic cross-section of a friction ring in accordance with a first preferred embodiment retrofitted into the bonded application shown in FIG. 3.

With reference to the drawings, FIG. 4 is a diagrammatic cross-sectional view of a conventional clutch 40, of type illustrated in FIGS. 1-3, retrofitted with a floating friction ring, generally designated 42, in accordance with a first preferred embodiment of the invention.

Clutch 40, shown in its engaged position, includes a front cover 36 having a base plate 34, a side wall 41 extending upwardly from the periphery of the base plate 34, and an annular interfering surface 35 which extends upwardly from the periphery of the base plate 34. The contoured floating friction ring 42 consists of an annular base section 44 having a first friction surface 43 for contacting with the friction surface 45 of the pressure plate 32, a second friction surface 46 for contacting with the base plate friction surface 33, a bridging section 47 which extends outwardly and upwardly from the periphery of the annular base section 44 and a circumferential wall 49 which extends upwardly from the bridging section 47 and is in slidable contact with the side wall 41 of the front cover 36. Bridging section 47 has a stepped cross-section which does not come into intimate contact with the interfering surface 35 of the front cover 36 when the clutch is engaged. Thus, a clearance 50 is maintained between the interfering surface 35 on the base plate 34 and the bridging section 47, thereby eliminating the need for machining the front cover 36 to remove the interfering surface 35 and reducing the excess wear which would be caused by frictional contact with the interfering surface 35.

Interaction of the circumferential wall 49 and the side wall 41 pilots and centers the friction ring 42 during operation of the clutch. Advantageously, this arrangement maintains the ring 42 in its proper orientation within the main bore 37 of the front cover 36. The circumferential wall 49 also increases the strength and rigidity of the ring 42 yielding more uniform engagement of the clutch and further extending the life of the friction ring 42.

Figure 5:
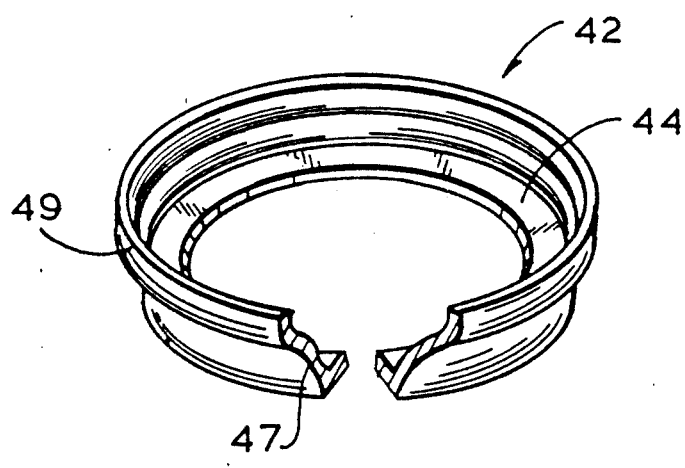
FIG. 5 is a cutaway perspective view of the friction ring of FIG. 4.

FIG. 5 is a perspective view of the friction ring of FIG. 4, with portion cutaway to the illustrate the contour of the ring including, annular base section 44, bridging section 47 including a stepped cross-section, and circumferential wall 49. For application in conventional lock-up clutches, the annular base section 44 preferably has an outer diameter in the range of 8 to 13 inches, and an inner diameter in the range of 6 to 12 inches, and the circumferential wall 49 has a height in the range of 0.125 to 1 inch.

FIG. 6 is a cross-sectional view of a cover and pressure plate, similar to FIG. 4, retrofitted with a floating friction ring generally designated 50, in accordance with a second preferred embodiment of the invention. An outer edge 51 of the friction ring 50 is arranged in slidable contact with the side wall 41 of the front cover 36, the bridging section 55 has a stepped cross-section which maintains a clearance 58 between itself and the interfering surface 35 during engagement of the clutch.

FIG. 7 is a cross-sectional view of a cover and pressure plate, similar to FIG. 4, retrofitted with a floating friction ring, generally designated 66, in accordance with a third preferred embodiment of the invention. As in previous figures, the clutch is shown in its engaged position. Here, the inside corner 65 of the front cover 70 defined by the intersection of the side wall 73 and the base plate 61 is rounded similar to the GM converter in FIGS. 1 and 2. The rounded inside corner 65 constitutes the interfering surface in this type of converter. The bridging section 74 of the floating friction ring 66 has an arcuate cross-section which generally conforms to the curvature of the inside corner 65 but still maintains a clearance 80 between itself and the inside corner 65 during engagement of the clutch. Therefore, the need for squaring the inside corner 65 to accommodate a conventional flat floating ring is eliminated.

Figure 8B:
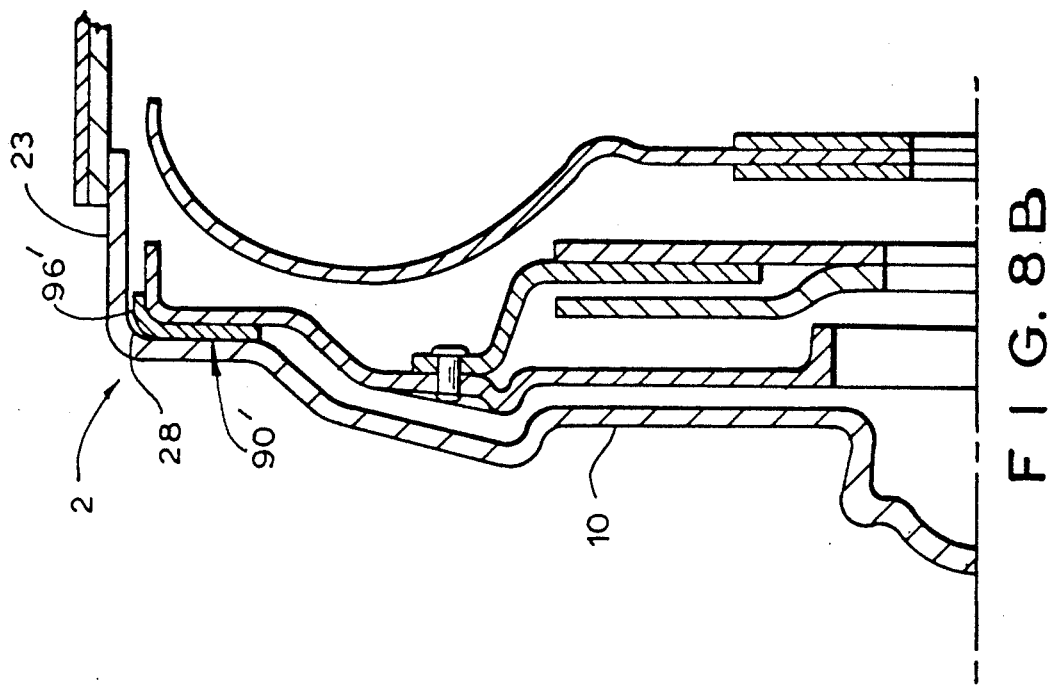
FIGS. 8A and B are a partial diagrammatic cross-section of the GM torque converter of FIGS. 1 and 2, respectively fitted with friction rings in accordance with fourth and fifth embodiments of the invention.
Figure 8A:
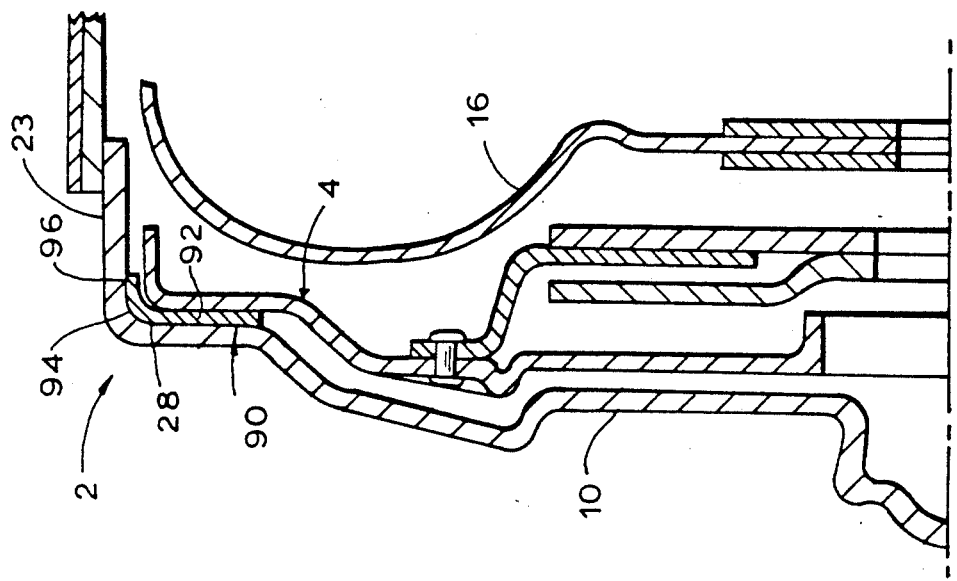

FIGS. 8A and B are a partial diagrammatic cross-sectional views of the GM torque converter of FIGS. 1 and 2, respectively fitted with friction rings in accordance with the fourth and fifth embodiments of the invention. The friction ring of FIG. 8A, designated 90, includes a base, bridging and outer edge sections 92, 94 and 96 which conform to the contour of cover 28. Secure lodgement of ring 90 in the cover of this embodiment is obtained by a biased placement of edge section 92 in conforming relation to the cover side wall 23.

Friction ring 90' of the fifth embodiment, illustrated in FIG. 8B, differs from the FIG. 8A arrangement, in the provision of an edge section 96' which is disposed in spaced overlying relation with respect to the cover. Avoidance of contact between the ring and cover in this structure enhances the piloting function of the ring.

Figure 9:
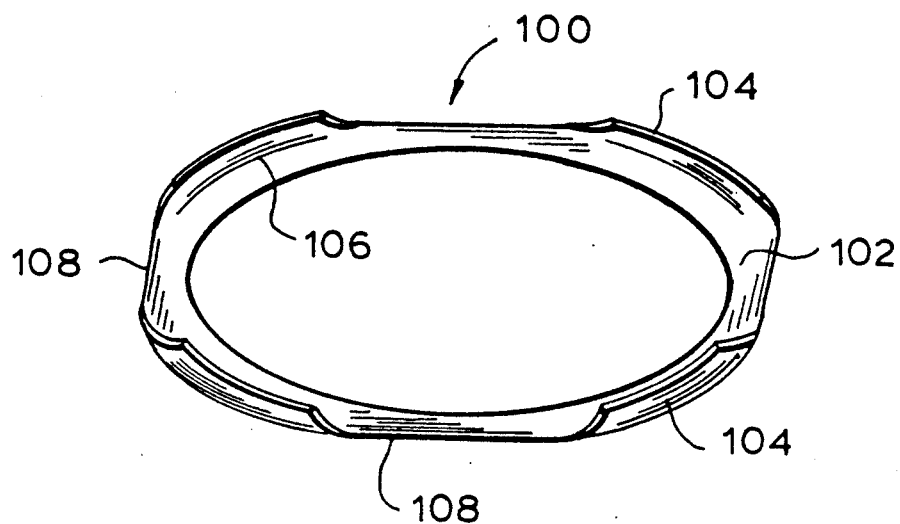
FIG. 9 is friction ring in accordance with a sixth preferred embodiment of the invention.

A friction ring 100 in accordance with a sixth embodiment of the invention, illustrated in FIG. 9, includes a base 102 and a plurality circumferentially spaced edge sections or wall segments 104 which extend from the base at bridging sections 106. Edge sections 106 are connected at the ring periphery at squared edge members 108. Use of segments in the wall yields an improved uniform contour in the ring wall free of crimped or bunched areas. As more fully set forth below, further advantage is obtained in this design in material savings and fabrication efficiencies. In operation of the torque converter, the segments further facilitate lubrication of the converter and displacement of excess oil in clutch application.

In accordance with a method of the invention, conventional friction paper which may of the type including a phenolic resin impregnation, is provided in uncured state and molded into the contoured friction ring of the invention by application of heat and pressure.

One process for forming the contoured friction ring involves placing an uncured blank of frictional material in a shaped mold and applying a pressure of between about 50 and 100 psi and a temperature of between about 250 degrees and 350 degrees Centigrade. An alternative process involves soaking a semi-cured blank of frictional material in a suitable solvent, e.g. water, methanol or ethanol, to soften the ring and then shaping the ring in a shaped mold under the aforementioned pressures and temperatures. Still another alternative process, which would be used in a situation where minimal deformation of the ring is required, involves placing a semi-cured blank of frictional material in a shaped mold and applying the aforementioned pressures and temperatures.

Figure 10:
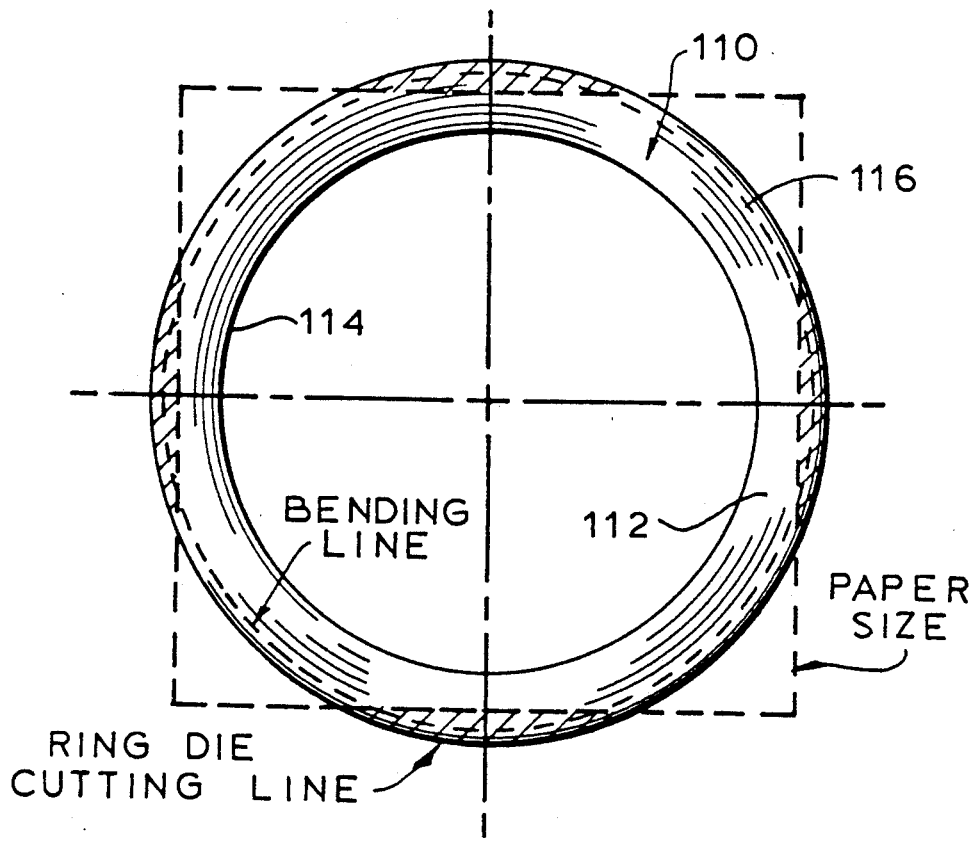
FIG. 10 illustrates a die member for manufacture of the friction ring of the sixth preferred embodiment of the invention.

FIG. 10 illustrates a die member 110 for fabrication of the ring member of the sixth preferred embodiment of the invention. The die 110 includes a generally annular base 112 which defines a central opening 114, and a radiused peripheral flange 116 which extends outwardly from the base. A squared blank of the friction material of the invention is cut and molded employing curing techniques set forth above into the ring illustrated in FIG. 9. Advantageously, material savings are effected by use of an "undersized" friction material blank. Further, it will be appreciated that the design promotes release of molded rings from the mold enhancing production efficiency.

From the foregoing discussion, it will be recognized by those skilled in the art that the present invention is not limited to use in retrofitting applications, but is also capable of being used to replace the bonded rings in torque converters at the manufacturing stage without the need for costly re-tooling of production lines. This is because the invention does not require any physical modifications of the clutch components of the converter. Thus, the previously discussed benefits of a floating friction ring could be had from the beginning in a converter like the GM converter of FIGS. 1 and 2 without increased cost to the manufacturer.

Furthermore, the invention could also be used in conventional converters which already use floating friction rings. In this case, the advantages would be the increased lifetime of the ring through the strength and rigidity added by the outer circumferential wall and the smooth piloting and centering achieved by the interaction of the outer wall and the side wall of the front cover.

While several embodiments have been described, it is apparent that other variations may be made without departing from the scope of the invention set forth in the appended claims.

I claim:

1. A contoured floating friction ring for use in a torque converter lock-up clutch, the lock-up clutch including a front cover and a pressure plate, the front cover including a base plate having a friction surface, outer peripheral edge, and side wall which extends outwardly in a generally axial direction from the peripheral edge, the front cover further including an interfering surface located proximate to the peripheral edge, the friction ring comprising:
 a base section which includes an outer edge, said base section being disposed over the friction surface;
 a bridging section extending outwardly from said outer edge, said bridging section being spaced from and disposed in conforming relation to the interfering surface; and
 an outer edge section extending from said bridging section disposed in overlying relation to the side wall of the front cover, so that when said friction ring is installed in the lock-up clutch, the friction ring is piloted and centered by the interaction of said outer edge section and the side wall, and a clearance is maintained between said bridging section and the interfering surface of the base plate.

2. A floating friction ring as recited in claim 1, wherein said base section has an annular disk shape configuration.

3. A floating friction ring as recited in claim 2, wherein said outer edge section is a circumferential wall extending outwardly in a generally axial direction from said bridging section.

4. A floating friction ring as recited in claim 2, wherein said bridging section has an arcuate cross-section.

5. A floating friction ring as recited in claim 2, wherein said bridging section has a stepped cross-section.

6. A floating friction ring as recited in claim 2, wherein said annular disk has an inner diameter of between about 6 and 12 inches and an outer diameter of between about 8 and 13 inches.

7. A floating friction ring as recited in claim 1, wherein said outer edge section is a circumferential wall extending outwardly in a generally axial direction from said bridging section.

8. A floating friction ring as recited in claim 7, wherein said circumferential wall has a length of between about 0.125 and 1 inch.

9. A floating friction ring as recited in claim 1, wherein said bridging section has arcuate cross-section.

10. A floating friction ring as recited in claim 1, wherein said bridging section has a stepped cross-section.

11. A floating friction ring as recited in claim 1, wherein said edge section is disposed in slidable relation to the side wall of the front cover.

12. A floating friction ring as recited in claim 1, wherein said edge section comprises a plurality of spaced wall segments.

13. A floating friction ring as recited in claim 1, wherein said friction ring is composed of a frictional paper impregnated with a phenolic resin.

14. A floating friction ring as recited in claim 13, wherein said friction ring is prepared by a process which includes the step of molding an uncured blank of frictional material in a shaped mold at a pressure between about 50 and 100 psi and a temperature between about 250 degrees and 350 degrees Centigrade.

15. A floating friction ring as recited in claim 13, wherein said friction ring is prepared by a process which includes the step of molding a semi-cured blank of frictional material in a shaped mold at a pressure between about 50 and 100 psi and a temperature between about 250 degrees and 350 degrees Centigrade.

16. A floating friction ring as recited in claim 15, wherein said semi-cured blank is soaked in a solvent prior to said molding step.

17. A method for retrofitting a conventional torque converter lock-up clutch with a contoured floating friction ring, the lock-up clutch including a front cover and a pressure plate, the front cover including a base plate having outer peripheral edge and side wall which extends outwardly in a generally axial direction from the peripheral edge, the front cover further including an interfering surface located proximate to the peripheral edge, the method employing a blank workpiece of friction ring material, comprising the steps of:
 (a) placing the blank friction material in overlying relation relative to the base plate and side wall of the cover;
 (b) applying controlled pressure of between about 50 and 100 psi and a temperature of between about 250° to 350° C. to configure the floating friction ring so that it generally conforms to the configuration of the base plate and side wall, and is spaced from the interfering surface.

18. A method for preparing a floating friction ring as recited in claim 17, wherein the blank work piece is a frictional paper impregnated with a phenolic resin.

19. A method for preparing a floating friction ring as recited in claim 17, further comprising the step of soaking said blank of frictional material in a solvent prior to said step of placing the blank in the cover.

20. The method of claim 17, wherein the floating friction ring comprises a base section which includes an outer edge, said base section being disposed over the base plate friction surface; a bridging section extending outward radially from said outer edge, said bridging section being spaced from the interfering surface; and an outer edge section extending from said bridging section disposed in slidable relation to the side wall of the front cover, so that when said friction ring is installed in the lock-up clutch, said friction ring is piloted and centered by the interaction of said outer edge section and the side wall and a clearance is maintained between said bridging section and the interfering surface of the base plate.

* * * * *